US008965986B1

(12) United States Patent
Acharya et al.

(10) Patent No.: US 8,965,986 B1
(45) Date of Patent: Feb. 24, 2015

(54) DEVICE DEPENDENT USER NOTIFICATION

(75) Inventors: Anish Acharya, Toronto (CA); Jeson Patel, Concord (CA)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/414,907

(22) Filed: Mar. 8, 2012

Related U.S. Application Data

(60) Provisional application No. 61/450,249, filed on Mar. 8, 2011.

(51) Int. Cl.
G06F 15/16 (2006.01)
H04M 15/00 (2006.01)

(52) U.S. Cl.
CPC .......... *H04M 15/844* (2013.01); *H04M 15/84* (2013.01); *H04M 15/83* (2013.01)
USPC ........... 709/206; 717/112; 717/113; 717/125; 717/126

(58) Field of Classification Search
CPC .... H04M 15/844; H04M 15/84; H04M 15/83
USPC ................... 709/206; 717/112, 113, 125, 126
See application file for complete search history.

(56) References Cited

U.S. PATENT DOCUMENTS

| 6,757,889 | B1* | 6/2004 | Ito ................................. 717/112 |
| 8,515,385 | B2 | 8/2013 | Sennett et al. |
| 8,624,727 | B2 | 1/2014 | Saigh et al. |
| 2002/0049049 | A1* | 4/2002 | Sandahl et al. ............... 455/414 |
| 2006/0148551 | A1* | 7/2006 | Walker et al. ................... 463/16 |
| 2007/0015508 | A1* | 1/2007 | Gross et al. ................... 455/436 |
| 2008/0153459 | A1* | 6/2008 | Kansal et al. .............. 455/412.1 |
| 2008/0155029 | A1* | 6/2008 | Helbling et al. ............. 709/206 |
| 2012/0166568 | A1* | 6/2012 | Helbling et al. ............. 709/206 |
| 2013/0079120 | A1* | 3/2013 | Walker et al. .................. 463/25 |

FOREIGN PATENT DOCUMENTS

| WO | 2009/017713 | 2/2009 |
| WO | 2010/127085 | 11/2010 |

\* cited by examiner

*Primary Examiner* — Arvin Eskandarnia
(74) *Attorney, Agent, or Firm* — Fish & Richardson P.C.

(57) ABSTRACT

Methods, systems, and apparatus, including computer programs encoded on a computer storage medium, for a device aware social graph. In one aspect, a method includes deciding to send a message to a user, the user being associated with devices. The method also includes selecting a user device from among the devices. The method also includes determining a message method. The method also includes obtaining an identifier associated with the user and the message method. The method also includes sending a message to the device using the message method and the identifier.

12 Claims, 3 Drawing Sheets

DEVICE DEPENDENT USER NOTIFICATION

CROSS-REFERENCE TO RELATED APPLICATIONS

This application claims priority to U.S. Provisional Application Ser. No. 61/450,249, filed on Mar. 8, 2011, entitled "Device Dependent User Notifications."

BACKGROUND

This specification relates to cross platform applications.

Many users access different applications using different user devices. Different user devices can have different capabilities, including the ability to receive different kinds of messages (e.g. SMS messages, e-mail messages, etc). Some applications support a variety of different user devices. Some users have multiple devices and use these devices to access the applications.

SUMMARY

This specification describes technologies relating to social graphs.

In general, one innovative aspect of the subject matter described in this specification can be embodied in methods that include the actions of deciding to send a message to a user, the user being associated with devices. The methods also include the actions of selecting a user device from among the devices. The methods also include the actions of determining a message method. The methods also include the actions of obtaining an identifier associated with the user and the message method. The methods also include the actions of sending a message to the device using the message method and the identifier.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Selecting the user device may include determining which of the devices was used most recently. Determining which of the devices was used most recently may include determining the user device of the devices which most recently sent a message to the data processing apparatus. Selecting the user device may include obtaining a pattern of usage associated with each of the devices; comparing a current time to each usage pattern; and selecting the user device based on the comparing. Determining the message method may include identifying a message method capable of being received by the device and being associated with the identifier associated with the user. Determining the message method may include identifying message methods, each message method capable of being received by the device and being associated with the identifier associated with the user; and selecting a message method from the plurality of message methods based on a rule hierarchy.

Particular embodiments of the subject matter described in this specification can be implemented so as to realize one or more of the following advantages. Applications can be developed that are customized to the devices of the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Many individuals access data and applications on a wide range of heterogeneous devices. For example, an individual may read their email on a web-enabled PC, a smart phone, and/or a tablet. Each of these user devices has unique characteristics and capabilities. For example, different devices have different sized screens, screen resolutions, operating system features, and wireless capabilities. One capability that is present on a variety of different user devices is the ability of the device to send and receive messages. For example, a smart phone may be capable of sending and receiving SMS messages, while a tablet device is capable of sending and receiving push messages. A web connected PC may be capable of sending and receiving various software based messages, including instant messages, messages from a social networking site and e-mail messages.

Applications can influence user behavior through messages. For example, a user may be notified that they have been challenged to a game of chess. Messages can be used to increase the distribution of an application (for example, through invitations) and can also be used to increase engagement and user retention.

Figure 1:
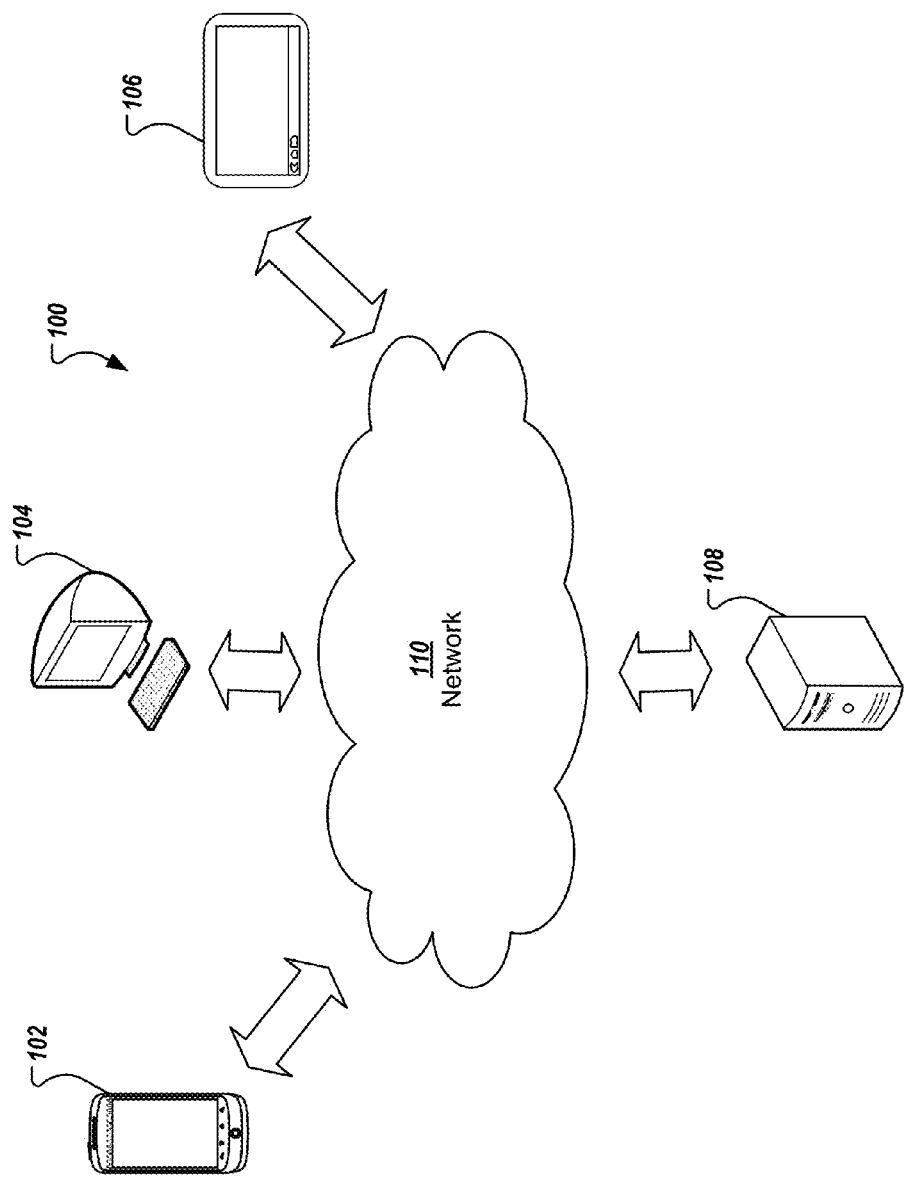
FIG. 1 illustrates an example of a cross platform application environment.

FIG. 1 illustrates an example of a cross platform application environment. In a cross-platform application environment 100, various users interact with each other across a variety of user devices. For example, a user using a smart phone 102, a user using a web-enabled personal computer 104, and a user using a tablet 106 can interact with each other and also with a server 108 executing application software.

The users receive messages over a channel that is appropriate to the user device they are currently using. For example, the smart phone 102 may receive SMS messages and the tablet 106 may receive a email message. Each message may be customized to the user device to increase the likelihood that the user device receives the message. For example, if a user is playing a cross-platform chess game on their web-enabled computer at 5 p.m. and that are challenged to another game, the user receives a web-based email message. If they are challenged 2 hours later, while playing the same game on a smart phone, the user receives an SMS based message.

The system stores and manages user device information. The system also transmits messages to the users via an appropriate user device specific channel. The system combines a variety of device specific user profile information with a single user profile. The user profile of a user can include multiple user device specific profiles. Each of these device specific profiles can include the necessary information to transmit a message via a specific channel to that user device.

For example, a device specific profile for a tablet can include a token necessary to send a push message. Similarly, a device specific profile for a web enabled computer can contain both an instant messaging identifier used to send instant messages and a social networking site identifier used to send messages over the social networking site. The user profile can also contain device independent information, for example a nickname for the user. The system can also store an indication of which user device was used most recently.

To send a message to the user, the system can examine the user's profile to determine the device the user most recently used to access the application. Based at least in part on the determined user device, the system determines which type of device specific message to send. In some implementations, multiple different methods of sending messages may be appropriate for a user device. For example, the user device may be capable of accepting instant messages, SMS messages, and e-mail messages. In some implementations, determining the method of sending a message is based on a rule of message preference hierarchy. For example, the system hierarchy may dictate that the system send a PUSH if possible, then an SMS message if possible, and finally an e-mail. The rules can allow the system to use different methods of sending messages based on different contexts. Context may include, for example, the time the message is sent, the content of the message, and the urgency of the message. For example, different methods may be used at different times. Content may be delivered differently based on its complexity, for example, complex content such as tables and graphics may be sent using e-mail while simpler content such as package tracking information may be sent using SMS message. Urgent information may be delivered differently than non-urgent information, for example, urgent information may be sent using SMS messages while less urgent information may be sent using email.

In some implementations, the rule can be established by the user. For example, a user may wish to receive an email during the evening hours even if the last way they accessed game was via their mobile device.

In some implementations, the server compares the message types to the user profile and determines which message is most likely to elicit a response. For example, if the user historically responds to e-mail messages and does not respond to SMS messages, the system will attempt to send an e-mail message before attempting to send an SMS message.

Once the system determines the method to use to send the message, the server obtains the device specific information for the determined method. For example, to send an instant message, the system obtains the instant messaging identifier or the e-mail address of the user.

In some implementations, with the user's permission, a process can be executed on a user device (for example, the smart phone 102, the web-enabled computer 104, and/or the tablet 106) that collects information about the how the user device accesses the applications. The client-side process can send a message to the server to indicate the state of the user device (i.e. whether the user device is currently in use or not). The process can be, for example, a standalone process executing in the background of the user device, a component integrated into the client side application, or a web-browser plugin.

This process can detect the state by monitoring the last usage of input and output functions on the device such as the keyboard, touch screen, etc. For example, on a smart phone with a capacitive or resistive touch screen, the process can monitor the last time a touch was registered on the screen. For a web browser, the process can monitor the last time the mouse, or other input device, was moved. This information is used to more accurately reflect which user device the user is currently using and to develop a more accurate description of the usage patterns of the user.

Figure 2:
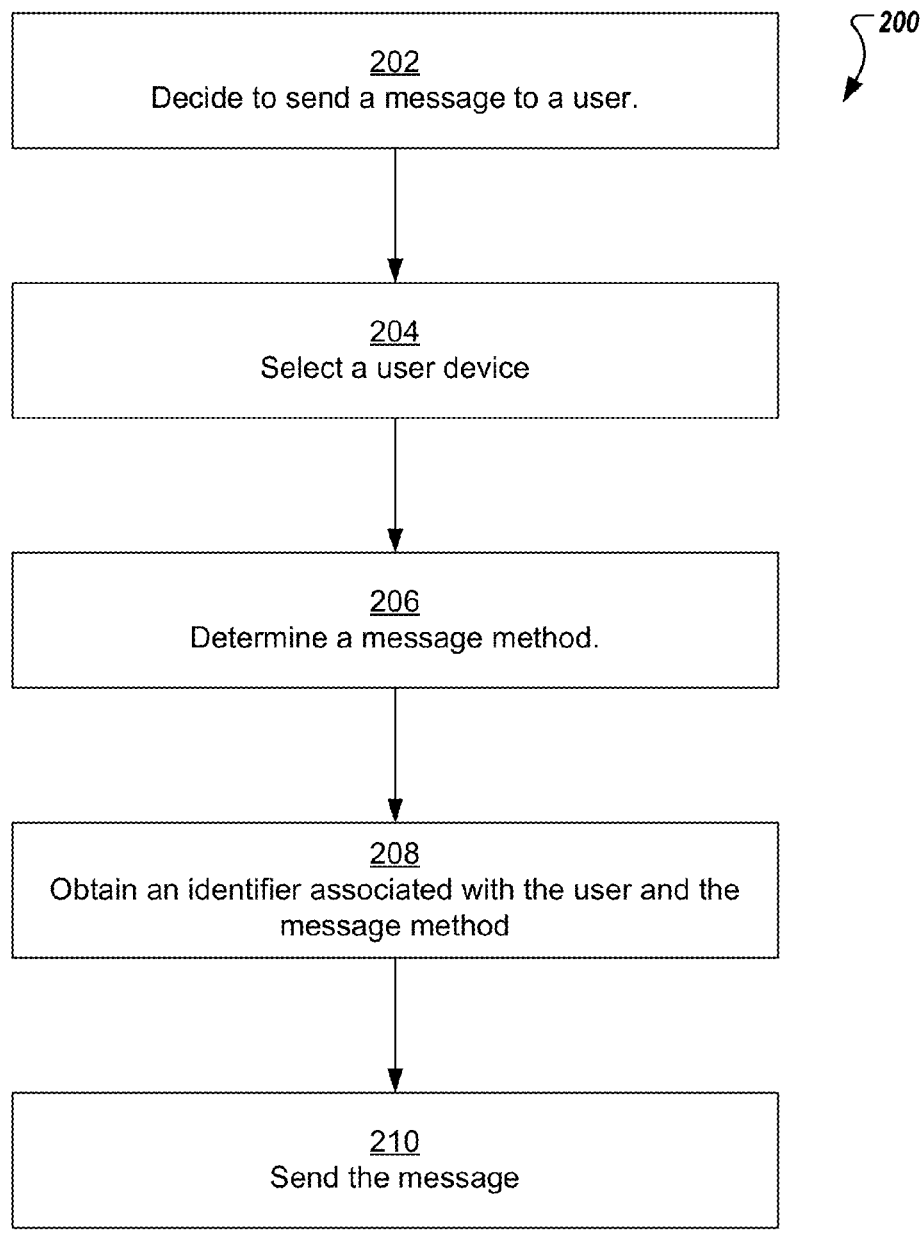
FIG. 2 is a flow chart of an example of a process for device dependent user notifications.

FIG. 2 is a flow chart of an example of a process for device dependent user notifications. The process can be performed by a computer system, for example the server 108 of FIG. 1. For simplicity, the process will be described in terms of a system performing the process.

The process 200 decides 202 to send a message to a user. The decision may be made by a human operator working on a user interface of a computer system, or may be made based upon programming logic. The user is associated with devices, for example, the user may be associated with a smart phone, a tablet computing device, and a personal computer.

The process 200 selects 204 a user device from among the devices. The process may select the user device based on which device was used most recently. For example, the process may select the user device which most recently communicated with a computer system executing the process.

The process 200 may also select the user device by analyzing usage patterns for each user device. The pattern of usage information may be determined as part of the process, or may have been previously determined and stored in a data store. For example, the pattern of usage information may indicate that the user uses a tablet device in the morning, a smart phone device during the day, and a personal computer in the evening. The process 200 may compare the current time to the pattern of usage information, and select a user device accordingly. For example, the process can select the tablet device in the morning, the smart phone during the day, and the personal computer in the evening.

The process 200 determines 206 a message method. The process 200 may identify message methods capable of being received by the selected device. The process 200 may also compare available message methods to information associated with the user. For example, a user may indicate that he prefers SMS text messages or e-mail. In some implementations, the process 200 may identify several message methods that have been selected by the user and can be received by the selected device. The process 200 may select a message method based on a set of rules. For example, the user may prefer SMS text messages to e-mail, and e-mail to PUSH notifications.

The process 200 obtains 208 an identifier associated with the user and the message method. For example, the process 200 may obtain the telephone number associated with the selected device in order to send the user an SMS text message.

The process 200 sends 210 the message to the device using the selected message method and the obtained identifier.

Figure 3:
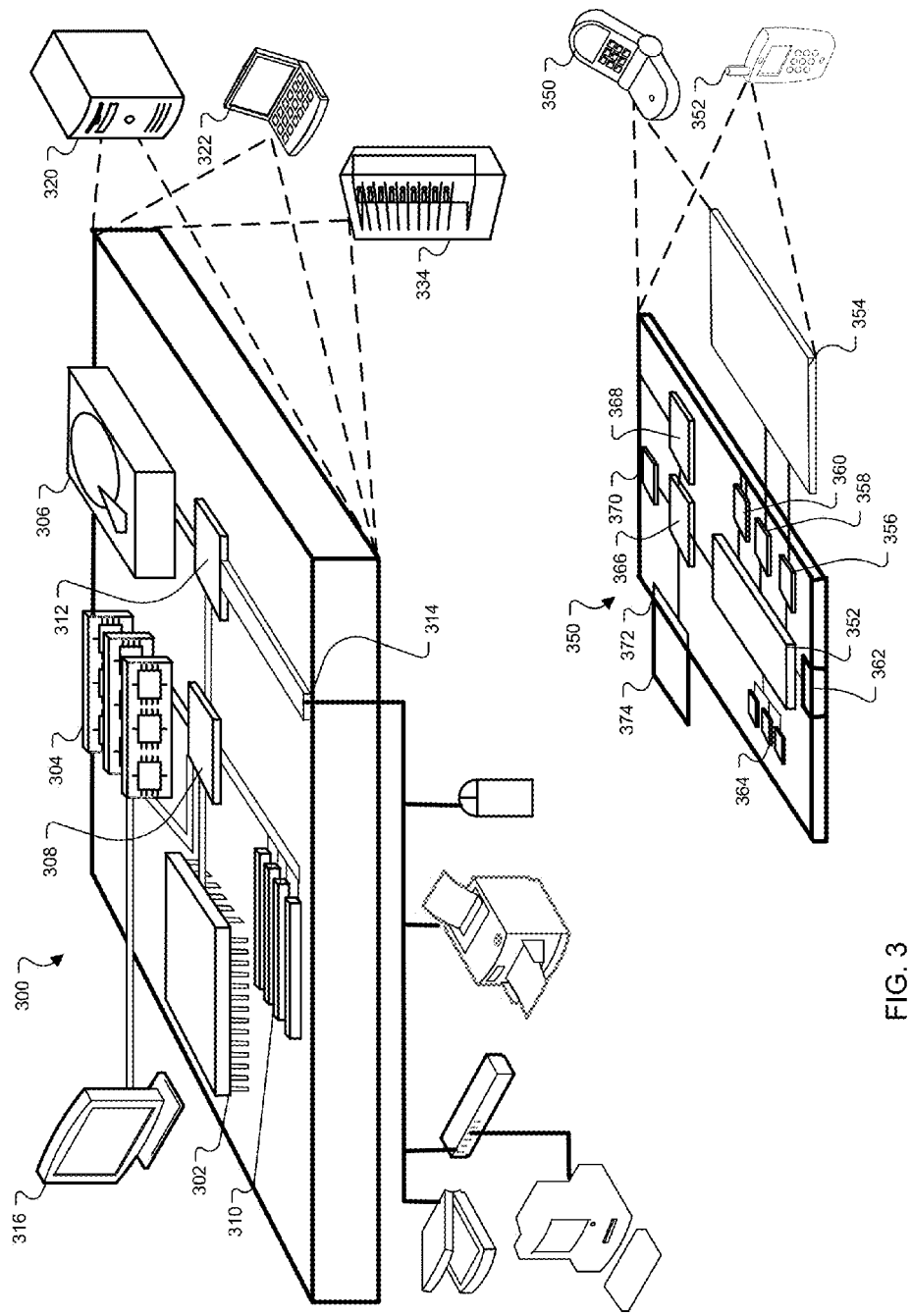
FIG. 3 is a block diagram of computing devices that may be used to implement the systems and methods described in this document, as either a client or as a server or plurality of servers.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally computing device 300 or 350 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various buses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA3000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of social network graphs and methods have been described, it should be recognized that numerous other applications are contemplated. Accordingly, other embodiments are within the scope of the following claims.

What is claimed is:

1. A method performed by data processing apparatus, the method Comprising:
   determining to send a message to a user, the user being associated with devices;
   selecting a user device from among the devices by determining which of the devices was used most recently, including determining the user device of the devices which most recently sent a message to the data processing apparatus;
   determining a message method from among a plurality of message methods supported by the selected user device based on a preference hierarchy that identifies a first message method of the plurality of message methods for a first period of time during a day and a second message method of the plurality of message methods, different from the first message method, for a second period of time during a day, different from the first period of time;
   obtaining an identifier associated with the user and the message method; and
   sending the message to the device using the message method and the identifier.

2. The method of claim 1, wherein selecting the user device comprises:
   obtaining a pattern of usage associated with each of the devices;

comparing a current time to each usage pattern; and
selecting the user device based on the comparing.

3. The method of claim 1, wherein determining the message method comprises:
identifying a message method capable of being received by the device and being associated with the identifier associated with the user.

4. The method of claim 1, wherein determining a message method is further based on an urgency of the message.

5. The method of claim 1, wherein determining a message method is further based on a profile associated with the user.

6. The method of claim 5, wherein the profile of the user includes a measure of historical responsiveness of the user to at least one of the message methods; and
identifying which message method is most likely to elicit a response is based on the historical responsiveness.

7. A non-transitory computer readable medium encoded with computer program instructions that when executed by one or more computers cause the one or more computers to perform operations comprising:
determining to send a message to a user, the user being associated with devices;
selecting a user device from among the devices by determining which of the devices was used most recently, including determining the user device of the devices which most recently sent a message to the one or more computers;
determining a message method from among a plurality of message methods supported by the selected user device based on a preference hierarchy that identifies a first message method of the plurality of message methods for a first period of time during a day and a second message method of the plurality of message methods, different from the first message method, for a second period of time during a day, different from the first period of time;
obtaining an identifier associated with the user and the message method; and
sending a message to the device using the message method and the identifier.

8. The medium of claim 7, wherein selecting the user device comprises:
obtaining a pattern of usage associated with each of the devices;
comparing a current time to each usage pattern; and
selecting the user device based on the comparing.

9. The medium of claim 7, wherein determining the message method comprises:
identifying a message method capable of being received by the device and being associated with the identifier associated with the user.

10. A system comprising:
one or more computers and one or more storage devices storing instructions that are operable, when executed by the one or more computers, to cause the one or more computers to perform operations comprising:
determining to send a message to a user, the user being associated with devices;
selecting a user device from among the devices by determining which of the devices was used most recently, including determining the user device of the devices which most recently sent a message to the one or more computers;
determining a message method from among a plurality of message methods supported by the selected user device based on a preference hierarchy that identifies a first message method of the plurality of message methods for a first period of time during a day and a second message method of the plurality of message methods, different from the first message method, for a second period of time during a day, different from the first period of time;
obtaining an identifier associated with the user and the message method; and
sending a message to the device using the message method and the identifier.

11. The system of claim 10, wherein selecting the user device comprises:
obtaining a pattern of usage associated with each of the devices;
comparing a current time to each usage pattern; and
selecting the user device based on the comparing.

12. The system of claim 10, wherein determining the message method comprises:
identifying a message method capable of being received by the device and being associated with the identifier associated with the user.

* * * * *